(12) United States Patent
Chiang et al.

(10) Patent No.: US 10,317,950 B2
(45) Date of Patent: Jun. 11, 2019

(54) ELECTRONIC DEVICE AND PIVOT ASSEMBLY THEREOF

(71) Applicant: ASUSTEK COMPUTER INC., Taipei (TW)

(72) Inventors: Tsung-Ju Chiang, Taipei (TW); Yu-Cheng Chang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 2 days.

(21) Appl. No.: 15/685,620

(22) Filed: Aug. 24, 2017

(65) Prior Publication Data

US 2018/0059739 A1 Mar. 1, 2018

(30) Foreign Application Priority Data

Aug. 31, 2016 (TW) .............................. 105128061 A

(51) Int. Cl.
*G06F 1/16* (2006.01)
*E05D 11/00* (2006.01)
*F16C 11/04* (2006.01)
*E05D 3/14* (2006.01)

(52) U.S. Cl.
CPC ............. *G06F 1/1681* (2013.01); *E05D 3/14* (2013.01); *E05D 11/0054* (2013.01); *F16C 11/04* (2013.01); *F16C 11/045* (2013.01); *G06F 1/1616* (2013.01); *E05Y 2900/606* (2013.01)

(58) Field of Classification Search
CPC . G06F 1/1616; G06F 1/1681; E05D 11/0054; E05D 3/14; E05D 11/0027; E05D 2011/0045; E05D 5/128; E05D 7/081; E05D 7/12; F16C 11/04; F16C 11/045; E05Y 2900/606

See application file for complete search history.

(56) References Cited

U.S. PATENT DOCUMENTS 4,960,256 A * 10/1990 Chihara ................. G06F 1/1616
16/361
5,168,426 A * 12/1992 Hoving ................. G06F 1/1616
16/361

(Continued)

FOREIGN PATENT DOCUMENTS

CN 202013546 U 10/2011
TW 201422936 A 6/2014

*Primary Examiner* — Dimary S Lopez Cruz
*Assistant Examiner* — Ingrid D Wright
(74) *Attorney, Agent, or Firm* — Muncy, Geissler, Olds & Lowe, P.C.

(57) ABSTRACT

A pivot assembly adapted to an electronic device is provided. The electronic device includes a first device body including a first pivot side edge and a second device body including a second pivot side edge. The pivot assembly comprises a first pivot pivotally disposed inside the first device body, a second pivot pivotally disposed at the second device body, a first connecting member pivotally connected to the first pivot and the second pivot, a third pivot pivotally disposed at the second device body, a fourth pivot pivotally disposed inside the first device body, and a second connecting member pivotally connected to the third pivot and the fourth pivot. The third pivot is closer to the second pivot side edge relative to the second pivot. The fourth pivot is closer to the first pivot side edge relative to the first pivot.

9 Claims, 10 Drawing Sheets

(56) References Cited

U.S. PATENT DOCUMENTS

| | | | | |
|---|---|---|---|---|
| 5,494,447 A | * | 2/1996 | Zaidan | G06F 1/1618 |
| | | | | 16/361 |
| 6,233,138 B1 | * | 5/2001 | Osgood | G06F 1/1616 |
| | | | | 248/920 |
| 6,272,006 B1 | * | 8/2001 | Lee | G06F 1/1616 |
| | | | | 16/342 |
| 8,982,542 B2 | | 3/2015 | Bohn | |
| 2009/0049646 A1 | * | 2/2009 | Rubin | H04M 1/0237 |
| | | | | 16/319 |
| 2011/0177850 A1 | | 7/2011 | Griffin et al. | |

\* cited by examiner

ELECTRONIC DEVICE AND PIVOT ASSEMBLY THEREOF

CROSS-REFERENCE TO RELATED APPLICATION

This application claims the priority benefit of Taiwan application serial No. 105128061, filed on Aug. 31, 2016. The entirety of the above-mentioned patent application is hereby incorporated by references herein and made partial of specification.

BACKGROUND OF THE INVENTION

Field of the Invention

The disclosure relates to an electronic device and a pivot assembly thereof and, more specifically, to an openable electronic device and a pivot assembly thereof.

Description of the Related Art

An openable electronic device, such as a notebook computer, usually needs a pivot assembly to pivotally connect a first device body (such as a display) and a second device body (such as a host with a keyboard). Thus, the electronic device can be closed or opened via the first device body and the second device body that pivotally connected with each other.

FIG. 1 is a schematic diagram showing a conventional notebook computer. As shown in FIG. 1, a notebook computer PA100 includes a first device body PA1, a second device body PA2 and a pivot assembly PA3. To facilitate the assemble of the pivot assembly PA3, two first pivot structures PA11 protrudes towards the second device body PA2 at a pivot side edge of the first device body PA1, and two second pivot structures PA21 protrudes towards the first device body PA1 at the pivot side edge of the second device body PA2. Since the first pivot structure PA11 and the second pivot structure PA21 are exposed outside, the appearance of the first device body PA1 and the second device body PA2 is not neat.

Additionally, the gaps are formed between the pivot assembly PA3 and each of the first pivot structure PA11 and the second pivot structure PA21, external substances or dust easily get into the interior of the pivot assembly PA3, which reduces the service life of the pivot assembly PA3.

BRIEF SUMMARY OF THE INVENTION

According to an aspect of the disclosure, a pivot assembly adapted to an electronic device is provided. The electronic device includes a first device body and a second device body. The first device body includes a first pivot side edge. The second device body includes a second pivot side edge corresponding to the first pivot side edge.

The pivot assembly comprises a first pivot, a second pivot, a first connecting member, a third pivot, a fourth pivot, and a second connecting member. The first pivot is pivotally disposed inside the first device body. The second pivot is pivotally disposed at the second device body. The first connecting member is pivotally connected to the first pivot and the second pivot. The third pivot is pivotally disposed at the second device body. The fourth pivot is pivotally disposed inside the first device body. The second connecting member is pivotally connected to the third pivot and the fourth pivot.

The third pivot is closer to the second pivot side edge relative to the second pivot. The fourth pivot is closer to the first pivot side edge relative to the first pivot. A plane in which an axis of the second pivot and an axis of the fourth pivot lie is defined as a switching plane. An axis of the third pivot and an axis of the first pivot that are located at different sides of the switching plane are turned to be located at the same side of the switching plane when the second device body is opened relative to the first device body.

According to another aspect of the disclosure, an electronic device is provided. The electronic device comprises a first device body, a second device body, and a pivot assembly. The first device body includes a first pivot side edge. The second device body includes a second pivot side edge corresponding to the first pivot side edge.

The pivot assembly includes a first pivot, a second pivot, a first connecting member, a third pivot, a fourth pivot, and a second connecting member. The first pivot is pivotally disposed inside the first device body. The second pivot is pivotally disposed at the second device body. The first connecting member is pivotally connected to the first pivot and the second pivot. The third pivot is pivotally disposed at the second device body. The fourth pivot is pivotally disposed inside the first device body. The second connecting member is pivotally connected to the third pivot and the fourth pivot.

The third pivot is closer to the second pivot side edge relative to the second pivot. The fourth pivot is closer to the first pivot side edge relative to the first pivot. A plane in which an axis of the second pivot and an axis of the fourth pivot lie is defined as a switching plane. An axis of the third pivot and an axis of the first pivot that are located at different sides of the switching plane are turned to be located at the same side of the switching plane when the second device body is opened relative to the first device body.

In embodiments, the electronic device is any electronic device that includes two device bodies pivotally connected via the pivot assembly to close or open the electronic device, such as a notebook computer, a flip phone and the like.

With the above configuration, the first pivot, the second pivot, the third pivot and the fourth pivot are hidden inside the first device body or the second device body no matter whether the second device body is closed or opened. The first pivot side edge of the first device body is not covered by the second device body. Additionally, when the second device body is closed, the whole pivot assembly is covered by the first device body and the second device body but not exposed outside. Thus, the appearance of the first device body and the second device body is neat.

In an embodiment, the pivot assembly further includes a cover which is fixed to and covers the first connecting member. With the cover, the first connecting member is not exposed outside. Thus, the external substances or the dust does not easily get into the interior of the pivot assembly easily, which prolongs the service life of the pivot assembly.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

The pivot assembly of the present disclosure can be widely applied in various electronic devices, such as notebook computers, flip phones and the like, which are not limited herein. In a preferred embodiment, an openable notebook computer including the pivot assembly is exemplified hereinafter for detailed description.

Figure 1:
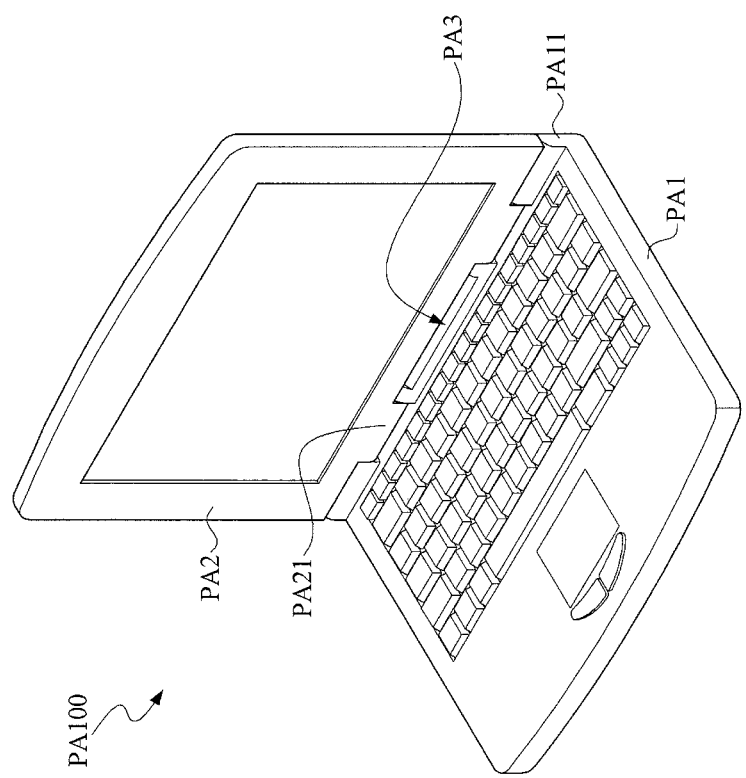
FIG. 1 is a schematic diagram showing a conventional notebook computer.
Figure 2:
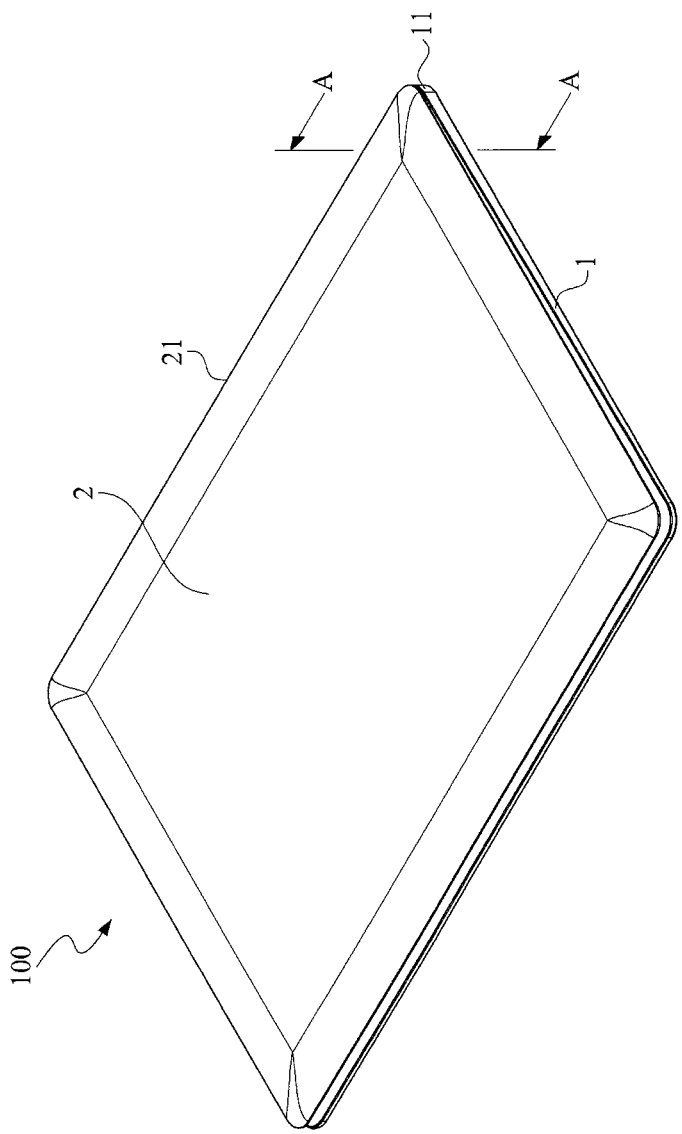
FIG. 2 is a schematic diagram showing a closed electronic device in an embodiment.
Figure 3:
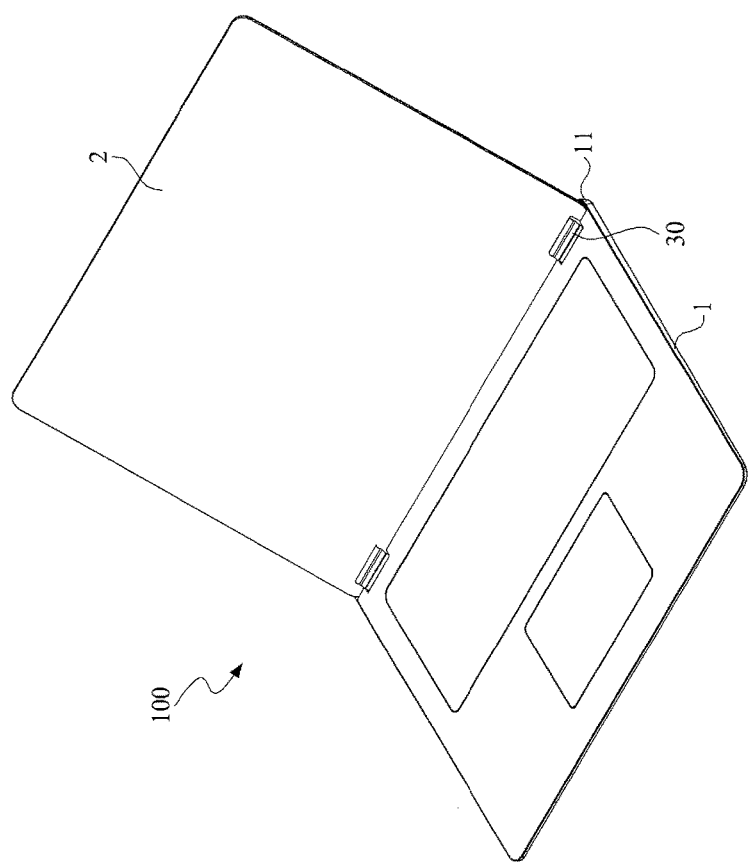
FIG. 3 is a schematic diagram showing an opened electronic device in an embodiment.
Figure 4:
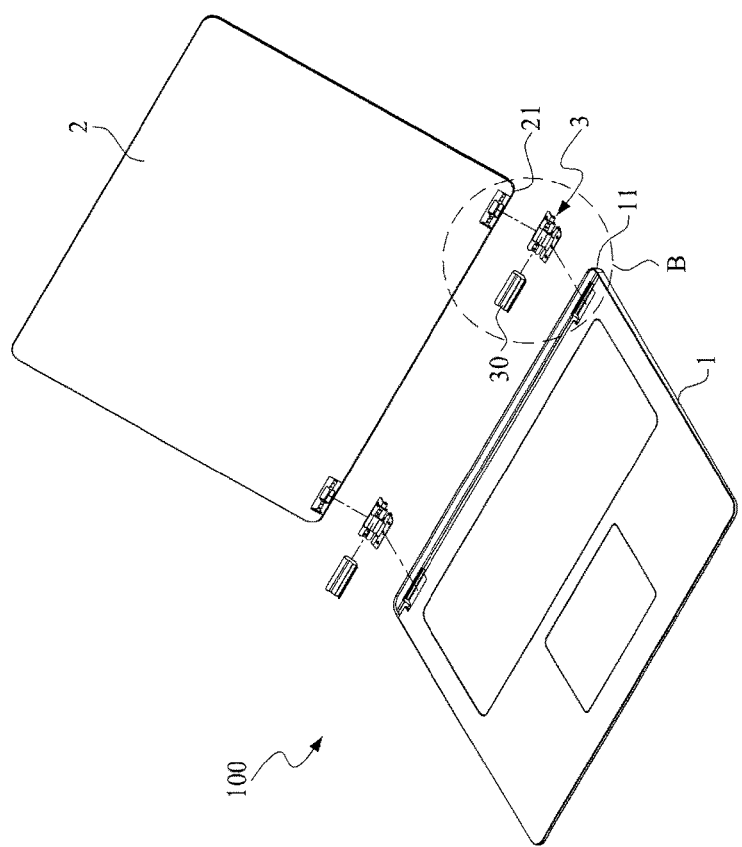
FIG. 4 is a partial exploded view of the electronic device in FIG. 3 in an embodiment.

Please refer to FIG. 2 to FIG. 4. FIG. 2 is a schematic diagram showing a closed electronic device in an embodiment. FIG. 3 is a schematic diagram showing an opened electronic device in an embodiment. FIG. 4 is a partial exploded view of the electronic device in FIG. 3 in an embodiment. As shown in FIG. 2 to FIG. 4, an electronic device 100 includes a first device body 1, a second device body 2 and at least a pivot assembly. The first device body 1 is a host and an input interface (such as a keyboard) of a notebook computer. The second device body 2 is a display.

In the embodiment, the electronic device 100 includes two pivot assemblies close to the right and left sides of the electronic device 100. Only one pivot assembly 3 is denoted in FIG. 4. In an embodiment, the number of the pivot assembly 3 one. The pivot assembly 3 is configured at the center of a pivot side edge of the electronic device 100.

Figure 5:
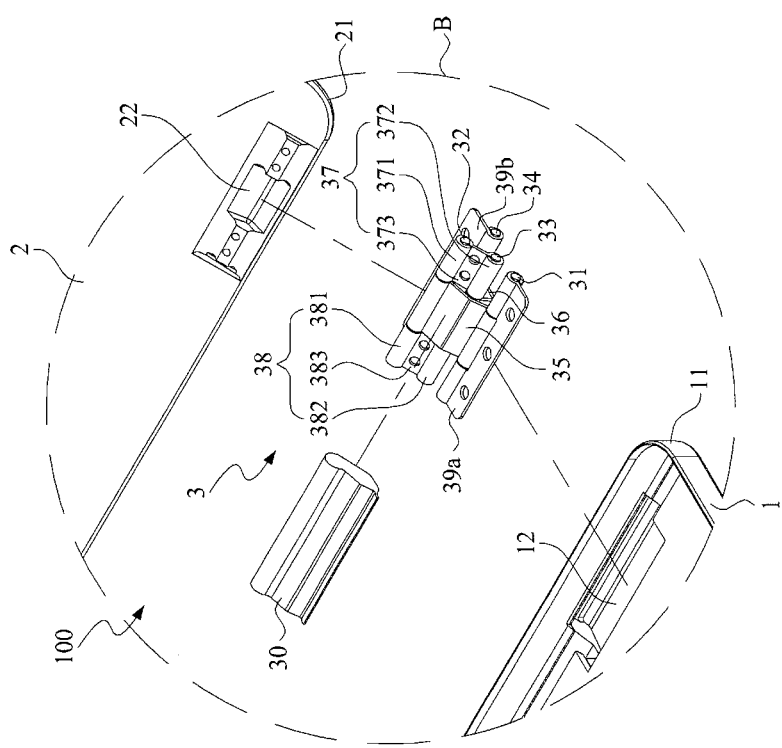
FIG. 5 is a partial enlarged view of components within circle B in FIG. 4 in an embodiment.

Please refer to FIG. 5. FIG. 5 is a partial enlarged view of components within circle B in FIG. 4 in an embodiment. As shown in FIG. 5, the first device body 1 includes a first pivot side edge 11 and a first receiving groove 12. The first receiving groove 12 corresponds to the pivot assembly 3 and is located close to the first pivot side edge 11. The second device body 2 includes a second pivot side edge 21 and a second receiving groove 22. The second pivot side edge 21 corresponds to the first pivot side edge 11. The second receiving groove 22 corresponds to the pivot assembly 3 and is located close to the second pivot side edge 21.

The pivot assembly 3 includes a cover 30, a first pivot 31, a second pivot 32, a third pivot 33, a fourth pivot 34, a first connecting member 35, a second connecting member 36, a third connecting member 37, a fourth connecting member 38, a first assembling component 39a and a second assembling component 39b.

The first pivot 31 and the first assembling component 39a are pivotally connected to each other. The first assembling component 39a is fixed at the first receiving groove 12. Then, the first pivot 31 is pivotally disposed within the first receiving groove 12. The second pivot 32 is pivotally disposed at the second device body 2. At least partial of the second pivot 32 is located within the second receiving groove 22. It is understood that "at least partial of" includes "partial of" and "the whole of".

The first connecting member 35 is pivotally connected to the first pivot 31 and the second pivot 32. The first connecting member 35 includes a first connecting member bending portion 351 to provide a space S1 (which is denoted in FIG. 6) at the first connecting member bending portion 351.

The third pivot 33 is pivotally disposed at the second device body 2 and close to the second pivot side edge 21 of the second device body 2. At least partial of the third pivot 33 is located within the second receiving groove 22. Similarly, it is understood that "at least partial of" includes "partial of" and "the whole of". The fourth pivot 34 is pivotally disposed within the first receiving groove 12 and close to the first pivot side edge 11 of the first device body 1. The second connecting member 36 is pivotally connected to the third pivot 33 and the fourth pivot 34. The second connecting member 36 includes a second connecting member bending portion 361 to provide a space S2 (which is denoted in FIG. 6) at the second connecting member bending portion 361.

The third connecting member 37 is disposed at a side (such as a right side) of the first connecting member 35 and the second connecting member 36. The third connecting member 37 includes a first pivot portion 371, a second pivot portion 372 and a first connecting portion 373. The first pivot portion 371 is pivotally connected to the second pivot 32. The second pivot portion 372 is pivotally connected to the third pivot 33. The first connecting portion 373 is connected to the first pivot portion 371 and the second pivot portion 372. The first connecting portion 373 is fixed at the second receiving groove 22 of the second device body 2. Then, the second pivot 32 and the third pivot 33 are pivotally disposed at the second device body 2. At least partial of the second pivot 32 and at least partial of the third pivot 33 are located within the second receiving groove 22.

Similarly, the fourth connecting member 38 is disposed at another side of the first connecting member 35 and the second connecting member 36. The fourth connecting member 38 includes a third pivot portion 381, a fourth pivot portion 382 and a second connecting portion 383. The third pivot portion 381 is pivotally connected to the second pivot 32. The fourth pivot portion 382 is pivotally connected to the third pivot 33. The second connecting portion 383 is connected to the third pivot portion 381 and the fourth pivot portion 382. The second connecting portion 383 is fixed at second receiving groove 22 of the second device body 2. Then, the second pivot 32 and the third pivot 33 are pivotally disposed at the second device body 2. At least partial of the second pivot 32 and partial of the third pivot 33 is located within the second receiving groove 22.

The fourth pivot 34 and the second assembling component 39b are pivotally connected to each other. The second assembling component 39b is fixed at the first receiving groove 12. Then, the fourth pivot 34 is pivotally disposed within the first receiving groove 12 and close to the first pivot side edge 11. The cover 30 is fixed to and covers the first connecting member 35 to hide the first connecting member 35.

Figure 6:
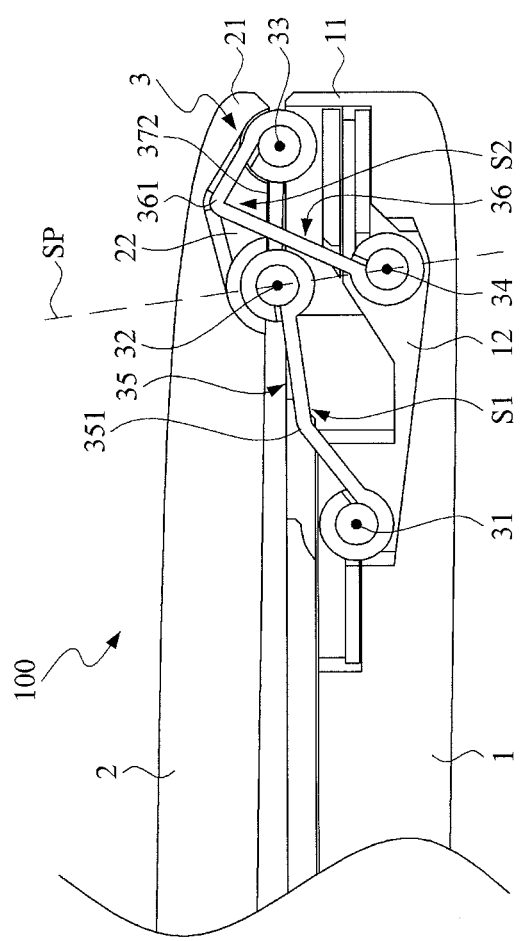
FIG. 6 is a schematic diagram showing partial of the electronic device without a cover viewed along line A-A in FIG. 2 in an embodiment.

In an embodiment, as show in FIG. 6, the first pivot 31 is spaced apart from the second pivot 32 by a first linear distance. The second pivot 32 is spaced apart from the third pivot 33 by a second linear distance. The third pivot 33 is spaced apart from the fourth pivot 34 by a third linear distance. The first linear distance is larger than the second linear distance and the third linear distance.

Figure 7:
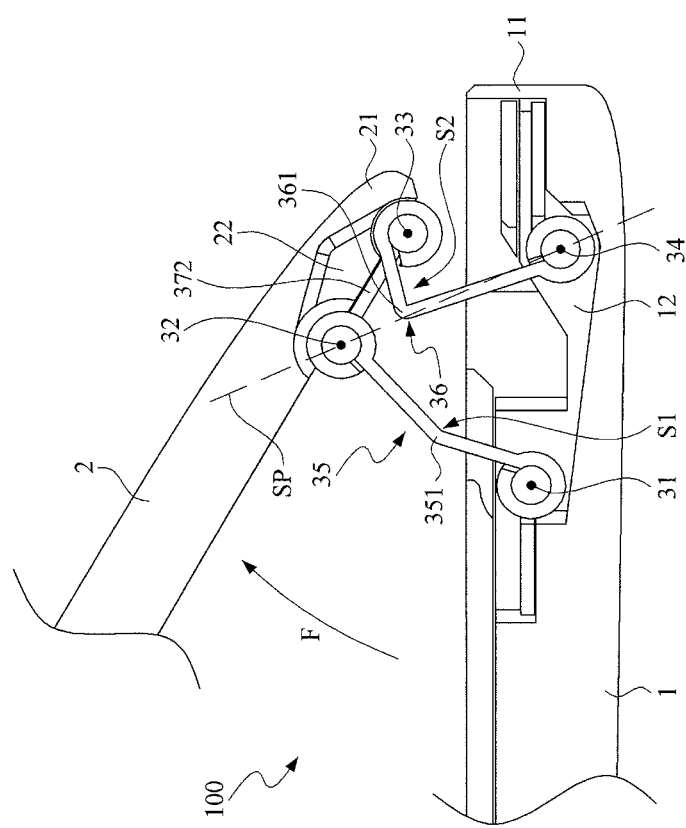
FIG. 7 is a schematic diagram showing partial of the electronic device in FIG. 6 when a second device body is opened to have a first travel in an embodiment.
Figure 8:
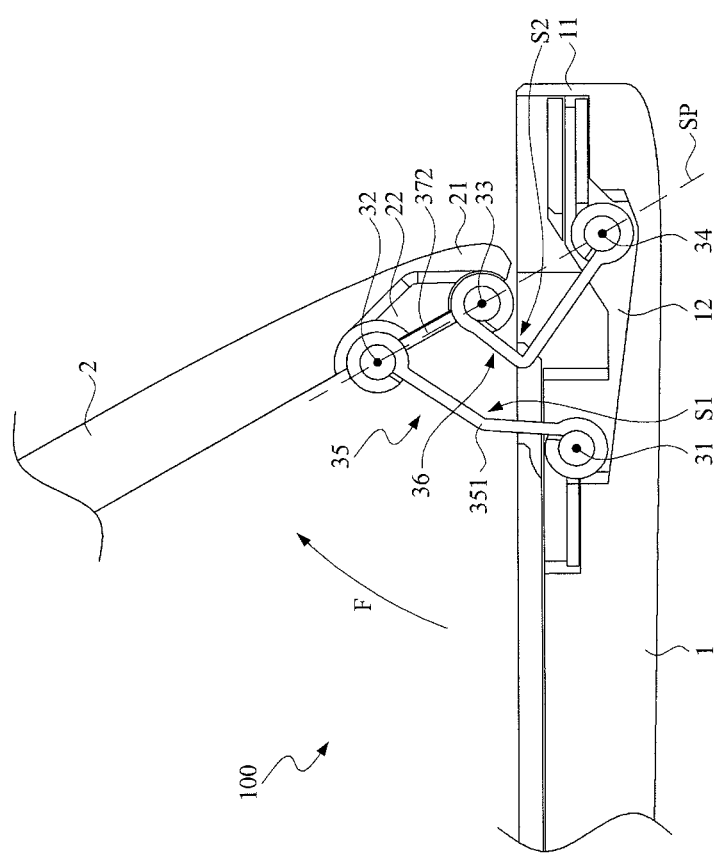
FIG. 8 is a schematic diagram showing partial of the electronic device in FIG. 6 when a second device body is opened to have a second travel in an embodiment.
Figure 9:
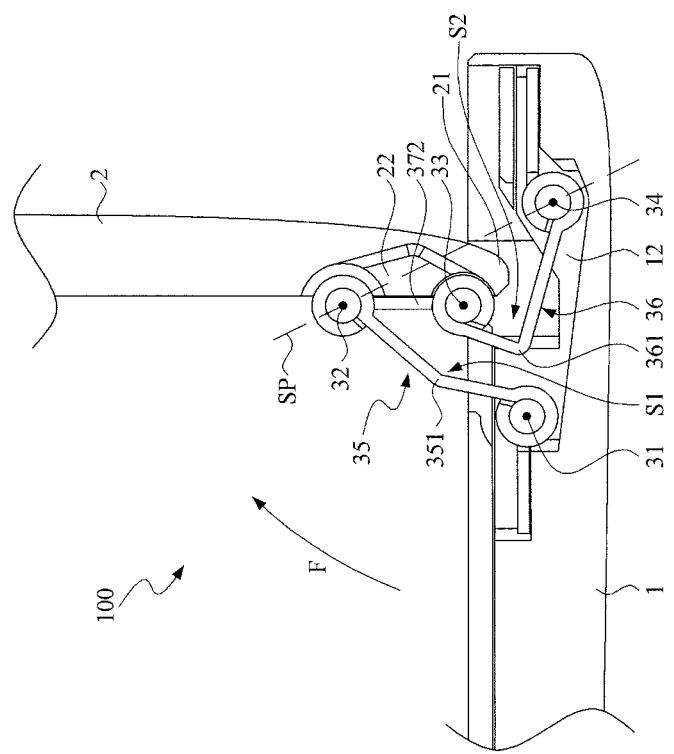
FIG. 9 is a schematic diagram showing partial of the electronic device in FIG. 6 when a second device body is opened to have a third travel in an embodiment.
Figure 10:
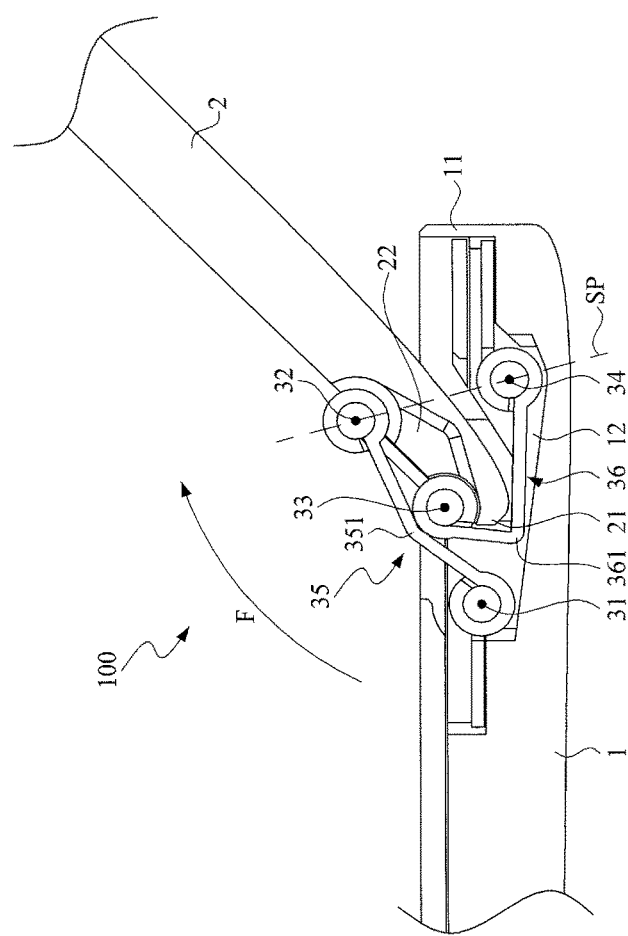
FIG. 10 is a schematic diagram showing partial of the electronic device in FIG. 6 when a second device body is opened to the maximum angle in an embodiment.

Please refer to FIG. 6 to FIG. 10. FIG. 6 to FIG. 10 are schematic diagrams sequentially showing partial of an electronic device in stages when a second device body is opened along an opening direction to the maximum angle relative to a first device body from a closed state. FIG. 6 is a schematic diagram showing partial of the electronic device with a cover removed viewed along line A-A in FIG. 2 in an embodiment. FIG. 7 is a schematic diagram showing partial of the electronic device in FIG. 6 when a second device body is opened to have a first travel in an embodiment. FIG. 8 is a schematic diagram showing partial of the electronic device in FIG. 6 when a second device body is opened to have a second travel in an embodiment. FIG. 9 is a schematic diagram showing partial of the electronic device in FIG. 6 when a second device body is opened to have a third travel in an embodiment. FIG. 10 is a schematic diagram showing partial of the electronic device in FIG. 6 when a second device body is opened to the maximum angle in an embodiment.

As shown in FIG. 6, a plane in which an axis (that is, a dot indicated by reference symbol 32 in FIG. 6) of the second pivot 32 and an axis (that is, the dot indicated by reference symbol 34 in FIG. 6) of the fourth pivot 34 lie is defined as a switching plane. When the first device body 1 is closed relative to the second device body 2, an axis (that is, the dot indicated by reference symbol 33 in FIG. 6) of the third pivot 33 and an axis (that is, the dot indicated by reference symbol 31 in FIG. 6) of the first pivot 31 are located at two different sides of the switching plane SP. At the time, as shown in FIG. 2 and FIG. 6, at least partial of the first pivot 31, the second pivot 32, the third pivot 33 and the fourth pivot 34 is located within the first receiving groove 12 or the second receiving groove 22. The gap between the first device body 1 and the second device body 2 is very small. Consequently, the pivot assembly 3 is almost covered by the first device body 1 and the second device body 2 and is not exposed outside in appearance. Since the first pivot side edge 11 of the first device body 1 is aligned to the second pivot side edge 21 of the second device body 2, structures for assembling the pivot assembly 3 are not seen at edges of the first device body 1 and the second device body 2. Therefore, the appearance of the first device body 1 and the second device body 2, even the whole electronic device 100, looks neat.

As shown in FIG. 7, when the second device body 2 is opened along an opening direction F from a closed state to have a first travel, although the second pivot side edge 21 slightly moves inwardly, the gap between the first device body 1 and the second body 2 is still very small. At the time, the axis of the third pivot 33 and the axis of the first pivot 31 are still located at the two different sides of the switching plane SP.

As shown in FIG. 8, when the second device body 2 is continuously opened along the opening direction F from the end of the first travel to have a second travel, the second pivot side edge 21 continues to move inwardly. The gap between the first device body 1 and the second body 2 becomes smaller. At the time, the axis of the third pivot 33 is located in the switching plane SP.

As shown in FIG. 9, when the second device body 2 is continuously opened along the opening direction F from the end of the second travel to have a third travel, the second pivot side edge 21 continues to move inwardly. At the time, the axis of the third pivot 33 and the axis of the first pivot 31 are turned to be located at the same side of the switching plane SP.

As shown in FIG. 9 and FIG. 10, when the second device body 2 is opened to the maximum angle along the opening direction F from the end of the third travel, the second pivot side edge 21 moves towards the second connecting member 36. At the time, the second connecting member bending portion 361 of the second connecting member 36 does not contact with the second pivot side edge 21 of the second device body 2 and allows the second pivot side edge 21 to get into the space S2. At the time, the second connecting member 36 moves towards the first connecting member 35, the first connecting member bending portion 351 of the first connecting member 35 does not contact with the second connecting member 36 and allows an end (which is pivotally connected to the third pivot 33) of the second connecting member 36 to get into the space S1.

When the second device body 2 is opened to the maximum angle as shown in FIG. 10, the second pivot side edge 21 of the second device body 2 abuts against the second connecting member bending portion 361 of the second connecting member 36, and the end (which is pivotally connected to the third pivot 33) of the second connecting member 36 abuts against the first connecting member bending portion 351 of the first connecting member 35. Thus, the second device body 2 and the second connecting member 36 are positioned, and the second device body 2 is restricted and would not be further opened continuously along the opening direction F.

In sum, when the second device body is opened along the opening direction to the maximum angle from the closed state relative to the first device body, the second device body has a total travel including the first travel, the second travel and the third travel in sequence. In the process of opening the second device body to the maximum angle, the axis of the third pivot and the axis of the first pivot located at the two different sides of the switching plane are turned to be located at the same side of the switching plane.

Since the first connecting member 35 is covered by the cover 30 (as shown in FIG. 4 and FIG. 5), all the components of the pivot assembly 3, except the cover 30, are covered by the first device body 1, the second device body 2 and the cover 30. Thus, external substances or dust do not easily get into the interior of the pivot assembly. Consequently, the appearance of the first device body and the second device body is neat. The external substances and the dust would not get into the interior of the pivot assembly, which prolongs the service life of the pivot assembly.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A pivot assembly, adapted to an electronic device, the electronic device including a first device body and a second device body, the first device body including a first pivot side edge, the second device body including a second pivot side edge corresponding to the first pivot side edge, the pivot assembly comprising:
a first pivot, pivotally disposed inside the first device body;
a second pivot, pivotally disposed at the second device body;
a first connecting member, pivotally connected to the first pivot and the second pivot;

a third pivot, pivotally disposed at the second device body, and being closer to the second pivot side edge relative to the second pivot;

a fourth pivot, pivotally disposed inside the first device body, and being closer to the first pivot side edge relative to the first pivot;

a second connecting member, pivotally connected to the third pivot and the fourth pivot; and a third connecting member disposed at a side of the first connecting member and the second connecting member, and including:
  a first pivot portion pivotally connected to the second pivot;
  a second pivot portion pivotally connected to the third pivot; and
  a first connecting portion connected to the first pivot portion and the second pivot portion and fixed to the second device body, and then the second pivot and the third pivot are pivotally disposed at the second device body;

wherein a plane in which an axis of the second pivot and an axis of the fourth pivot lie is defined as a switching plane, when the second device body is opened relative to the first device body, an axis of the third pivot and an axis of the first pivot that are located at different sides of the switching plane are turned to be located at a same side of the switching plane.

2. The pivot assembly according to claim 1, wherein the pivot assembly further includes a fourth connecting member disposed at another side of the first connecting member and the second connecting member, the fourth connecting member includes:
  a third pivot portion pivotally connected to the second pivot;
  a fourth pivot portion pivotally connected to the third pivot; and
  a second connecting portion connected to the third pivot portion and the fourth pivot portion and fixed to the second device body, and then the second pivot and the third pivot are pivotally disposed at the second device body.

3. The pivot assembly according to claim 1, wherein the pivot assembly further includes a first assembling component pivotally connected to the first pivot and fixed inside the first device body, and then the first pivot is pivotally disposed inside the first device body.

4. The pivot assembly according to claim 1, wherein the pivot assembly further includes a second assembling component pivotally connected to the fourth pivot and fixed inside the first device body, the fourth pivot is pivotally disposed inside the first device body.

5. The pivot assembly according to claim 1, wherein the pivot assembly further includes a cover which is fixed to and covers the first connecting member.

6. The pivot assembly according to claim 1, wherein the second connecting member further includes a second connecting member bending portion for providing a first space, the second connecting member bending portion does not contact with the second device body and allows the second pivot side edge to get into the first space when the second device body is opened to have a third travel.

7. The pivot assembly according to claim 6, wherein the first connecting member further includes a first connecting member bending portion for providing a second space, the first connecting member bending portion does not contact with the second connecting member and allows an end of the second connecting member to get into the second space when the second device body is opened to have the third travel.

8. An electronic device comprising:
  a first device body, including a first pivot side edge;
  a second device body, including a second pivot side edge corresponding to the first pivot side edge; and
  a pivot assembly including:
    a first pivot, pivotally disposed inside the first device body;
    a second pivot, pivotally disposed at the second device body;
    a first connecting member, pivotally connected to the first pivot and the second pivot;
    a third pivot, pivotally disposed at the second device body, and being closer to the second pivot side edge relative to the second pivot;
    a fourth pivot, pivotally disposed inside the first device body, and being closer to the first pivot side edge relative to the first pivot;
    a second connecting member, pivotally connected to the third pivot and the fourth pivot; and
    a third connecting member disposed at a side of the first connecting member and the second connecting member, and including:
      a first pivot portion pivotally connected to the second pivot;
      a second pivot portion pivotally connected to the third pivot; and
      a first connecting portion connected to the first pivot portion and the second pivot portion and fixed to the second device body, and then the second pivot and the third pivot are pivotally disposed at the second device body;
    wherein a plane in which an axis of the second pivot and an axis of the fourth pivot lie is defined as a switching plane, when the second device body is opened relative to the first device body, an axis of the third pivot and an axis of the first pivot that are located at different sides of the switching plane are turned to be located at a same side of the switching plane.

9. The electronic device according to claim 8, wherein the first device body includes a first receiving groove, the second device body includes a second receiving groove, the first pivot and the fourth pivot are pivotally disposed within the first receiving groove, and at least partial of the second pivot and partial of the third pivot are pivotally disposed within the second receiving groove.

* * * * *